United States Patent
Bush et al.

(10) Patent No.: US 10,880,454 B2
(45) Date of Patent: *Dec. 29, 2020

(54) CHIP AND SUPPLY ITEM FOR IMAGING DEVICE, INCLUDING COMMUNICATION

(71) Applicant: Lexmark International, Inc., Lexington, KY (US)

(72) Inventors: Stephen Porter Bush, Richmond, KY (US); Timothy John Rademacher, Lexington, KY (US); Christopher Alan Adkins, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,695

(22) Filed: Aug. 5, 2019

(65) Prior Publication Data

US 2019/0356817 A1 Nov. 21, 2019

Related U.S. Application Data

(63) Continuation of application No. 15/952,376, filed on Apr. 13, 2018, now Pat. No. 10,375,273.

(51) Int. Cl.
*H04N 1/44* (2006.01)
*H04L 9/32* (2006.01)
(Continued)

(52) U.S. Cl.
CPC ........ *H04N 1/4426* (2013.01); *B41J 2/17503* (2013.01); *G03G 15/50* (2013.01);
(Continued)

(58) Field of Classification Search
None
See application file for complete search history.

(56) References Cited

U.S. PATENT DOCUMENTS

| 7,356,279 B2 | 4/2008 | Miller |
| 8,332,934 B2 | 11/2012 | Lee |

(Continued)

FOREIGN PATENT DOCUMENTS

| JP | 2000-246921 A | 9/2000 |
| JP | 2004-195814 A | 7/2004 |

(Continued)

OTHER PUBLICATIONS

Non-final Office Action, U.S. Appl. No. 15/952,365, dated Sep. 5, 2019.

(Continued)

*Primary Examiner* — Paul F Payer

(57) ABSTRACT

A supply item has toner for use in an imaging device. A chip has memory storing quanta indicating allowed usage of the supply item over its lifetime and a multiplier correlating the quanta to toner mass. The imaging device requires quanta to conduct imaging operations and loads the quanta and multiplier by way of a certificate stored in the memory. The imaging device retrieves quanta from the chip over time and both devices keep tally. Initialization between the supply item and imaging device includes providing encrypted and unencrypted instances of firmware versions and certificates from the supply item that the imaging device can compare for security. Alternatively, the supply item defines a fuser assembly, imaging unit, intermediate transfer member, or other component installed for use in the imaging device.

20 Claims, 8 Drawing Sheets

(51) Int. Cl.
*H04N 1/00* (2006.01)
*G03G 15/00* (2006.01)
*G06F 21/33* (2013.01)
*B41J 2/175* (2006.01)
*G03G 21/18* (2006.01)
*G03G 15/08* (2006.01)

(52) U.S. Cl.
CPC .......... *G06F 21/335* (2013.01); *H04L 9/3268* (2013.01); *H04N 1/00015* (2013.01); *H04N 1/00034* (2013.01); *H04N 1/00058* (2013.01); *H04N 1/0097* (2013.01); *H04N 1/00965* (2013.01); *G03G 15/0863* (2013.01); *G03G 15/0865* (2013.01); *G03G 15/553* (2013.01); *G03G 15/556* (2013.01); *G03G 21/1882* (2013.01)

(56) References Cited

U.S. PATENT DOCUMENTS

| | | | |
|---|---|---|---|
| 8,602,536 | B1 | 12/2013 | Sarnoff |
| 9,137,021 | B2 | 9/2015 | Okazawa |
| 9,166,800 | B2 * | 10/2015 | Itoh ................... H04L 9/3273 |
| 9,323,950 | B2 | 4/2016 | Maletsky |
| 9,336,471 | B2 | 5/2016 | Jeong |
| 9,393,799 | B2 | 7/2016 | Thacker, III et al. |
| 9,465,351 | B2 | 10/2016 | Miller et al. |
| 9,581,935 | B2 | 2/2017 | Lee |
| 9,645,546 | B2 | 5/2017 | Wang et al. |
| 9,753,680 | B2 | 9/2017 | Liu |
| 9,819,820 | B2 | 11/2017 | Ding |
| 2004/0153415 | A1 | 8/2004 | Adkins |
| 2006/0176514 | A1 | 8/2006 | Nakazato |
| 2008/0022083 | A1 | 1/2008 | Funk |
| 2011/0013916 | A1 | 1/2011 | Katoh |
| 2014/0169803 | A1 | 6/2014 | Lee |
| 2014/0181524 | A1 | 6/2014 | Itoh |
| 2014/0270813 | A1 | 9/2014 | Ignatchenko |
| 2017/0123344 | A1 | 5/2017 | He |
| 2017/0131658 | A1 | 5/2017 | Lee |

FOREIGN PATENT DOCUMENTS

| | | |
|---|---|---|
| JP | 2005-202364 A | 7/2005 |
| JP | 2010-511927 A | 4/2010 |
| JP | 2012-022549 A | 2/2012 |
| KR | 10-2013-0085554 A | 7/2013 |
| WO | 2014-141139 A1 | 9/2014 |

OTHER PUBLICATIONS

Office Action, JP patent application 2019-074940, dated Aug. 6, 2019.
Office Action, Republic of Korea patent application 10-2019-0043292, dated Jul. 22, 2019.
Extended European search report, EP19168904.1, dated Aug. 16, 2019.
Inventor Declaration; 1pp; Dec. 10, 2018.

* cited by examiner

CHIP AND SUPPLY ITEM FOR IMAGING DEVICE, INCLUDING COMMUNICATION

CROSS REFERENCES TO RELATED APPLICATIONS

This patent application is a continuation application of U.S. patent application Ser. No. 15/952,376, filed Apr. 13, 2018, titled "Chip and Supply Item for Imaging Device, Including Communication."

BACKGROUND

1. Field of the Disclosure

The present disclosure relates to supply items of imaging devices, such as toner cartridges, fusers, imaging units, intermediate transfer members, or the like. It relates further to chips associated with the supply items and to communications with imaging devices.

2. Description of Related Art

Users replace spent supply items with new ones during maintenance or replenishment of components or toner in imaging devices. As supply items are often configured with a chip storing metrics, identification, or other details about the supply item, there exists a need to communicate the chip to a controller of the imaging device. The need extends to securing communications between the chip and controller and establishing trust with one another.

SUMMARY

The above and other problems are solved with a chip and supply item for an imaging device, including communicating with a controller of the imaging device. In one embodiment, a supply item has toner for use in an imaging device. A chip has memory storing quanta indicating allowed usage of the supply item over its lifetime and a multiplier correlating the quanta to toner mass. The imaging device requires quanta to conduct imaging operations and loads the quanta and multiplier by way of a certificate stored in the memory. The imaging device retrieves quanta from the chip over time and both devices keep tally. Initialization between the supply item and imaging device includes providing encrypted and unencrypted instances of firmware versions and certificates from the supply item that the imaging device can compare for security. Alternatively, the supply item defines a fuser assembly, imaging unit, intermediate transfer member, or other component installed for use in the imaging device.

DETAILED DESCRIPTION

Figure 1:
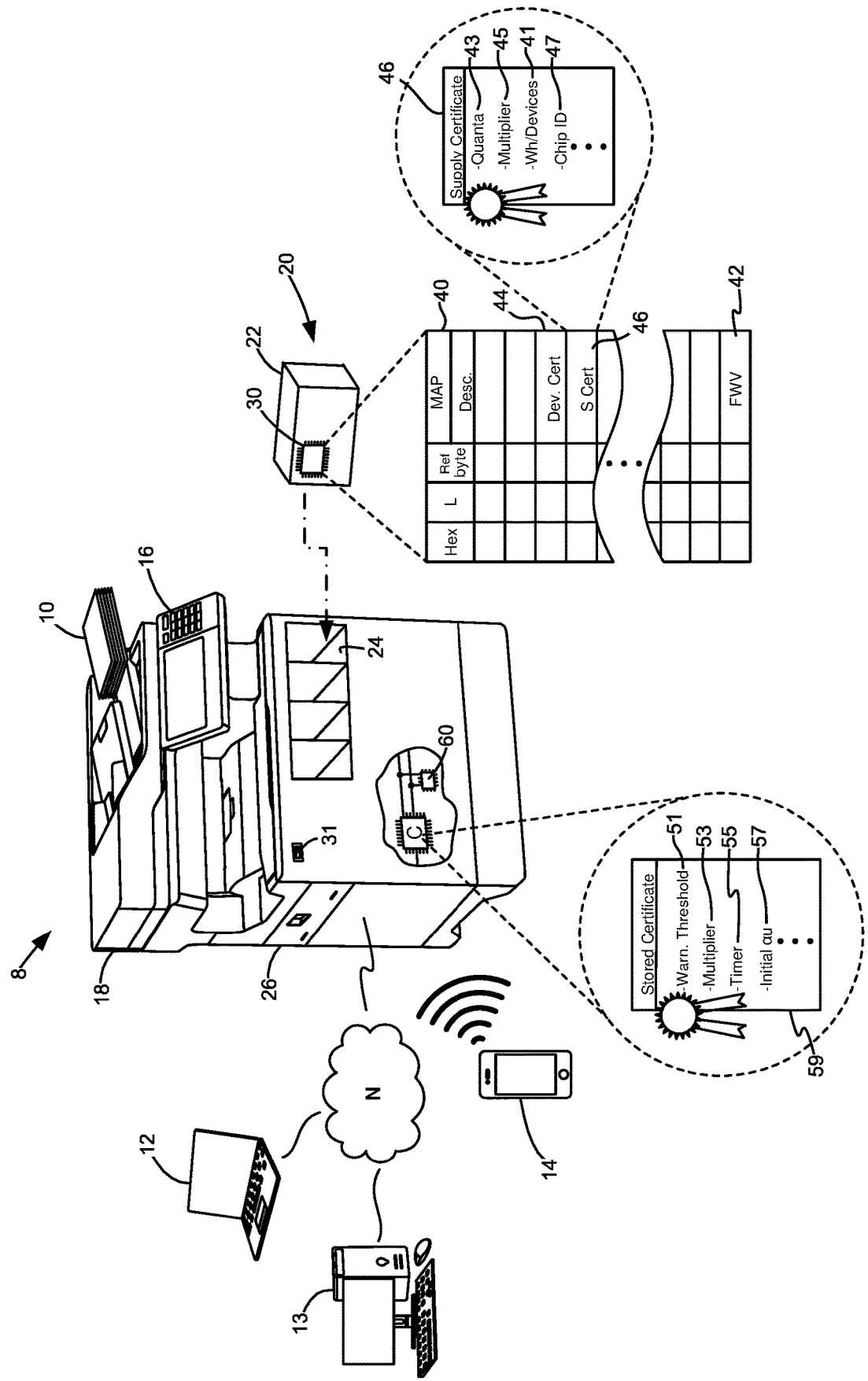
FIG. 1 is a diagram of an imaging device and supply item, including chip for communication with the imaging device.

With reference to FIG. 1, an imaging device 8 typifies a printer, all-in-one (AIO) device, multi-function printer (MFP), copy machine, scanner, fax machine, or the like. It produces a hard copy output of media 10 upon processing a copy, fax, or print job. It receives jobs from wired or wireless computing connections to a laptop 12, desktop computer 13, mobile device 14, fax 16, scanner 18, etc. over a direct or indirect computing connection (N), as is familiar. A controller C of the imaging device, such as an ASIC(s), microprocessor(s), circuit(s), combination thereof, etc., directs the imaging operations from receipt of the job through hard copy output, as is also familiar.

A supply item 20 installs with the imaging device during use. The supply item typifies one or more toner cartridges, fuser assemblies, imaging units, intermediate transfer members (ITMs), or the like. Its housing 22 defines a shape accommodating its contents and has a size appropriate for inserting into an opening 24 of the imaging device. The opening resides externally to the imaging device or internally upon opening a door 26, for example. The supply item 20 also includes a chip 30. The chip 30 is configured for attachment to the housing 22 of the supply item, or resides elsewhere. When attached, a connector in the imaging device electrically contacts the chip 30 to the controller C upon installation of the supply item. When not attached, the chip 30 connects to the controller by way of a direct or indirect computing connection, such as at USB port 31.

In certain embodiments, the chip 30 includes memory 40 having contents used for processing and may be provided to or made readable by the controller upon the issuance of appropriate commands from the imaging device. A Map of the memory, readable by humans and corresponding to the contents of the memory, includes values such as a firmware version (FWV) 42 identifying a current version of firmware on the chip. The FWV may take many forms, but can be listed with numbers and/or letters including or not decimal points or commas, e.g., DW 1.0, or take any form. The memory also includes one or more certificates usable to establish trust between the chip and the controller and to bundle together items useful during processes of certification. The certificates can be issued by a manufacturer or other supplier of the chip, for example, such as a device certificate 44 (Dev. Cert.) or a manufacturer of supply items and attendant chips, such as supply certificate 46 (SCert). In various forms, the device certificate 44 bundles together various chip identifies, such as serial or part numbers of the chip and may include unique signatures so that items in communication with the chip can trust the source of the chip. In one instance, the device certificate includes a device unique public key signed by a global key to instill trustworthiness between devices regarding the contents and security of the chip.

In the supply certificate 46, contents may be bundled together identifying features particular to the supply item. The SCert includes, but is not limited to, types 41 of imaging devices in which the supply item works, how much quanta (Q) 43 is associated with the supply item, and one or more multipliers (M) 45 that serve as correction factor(s) to assist an imaging engine of the imaging device when conducting imaging operations. As will be seen below, the quanta indicates an allowed usage of the supply item over a lifetime of the supply item while the multiplier correlates the quanta to a metric related to a type of the supply item. When the supply item typifies a toner cartridge, the quanta indicates the allowed usage of the imaging toner in the housing 22 of the supply item 20 over a lifetime thereof and the multiplier correlates the quanta to mass of the imaging toner. The quanta and multiplier are set during manufacturing of the supply item and stored in memory. The SCert may additionally include items of interest for communication to the controller of the imaging device, such as a chip identifier 47, thus duplicating or not items bundled in the device certificate or otherwise found in memory. The Map may also note reference to a starting byte (Ref. Byte and its corresponding Hexadecimal (Hex) mapping) in the memory 40 in which the contents of the memory can be found and its length (L), in bits, for example. Still other embodiments are possible.

Figure 2:
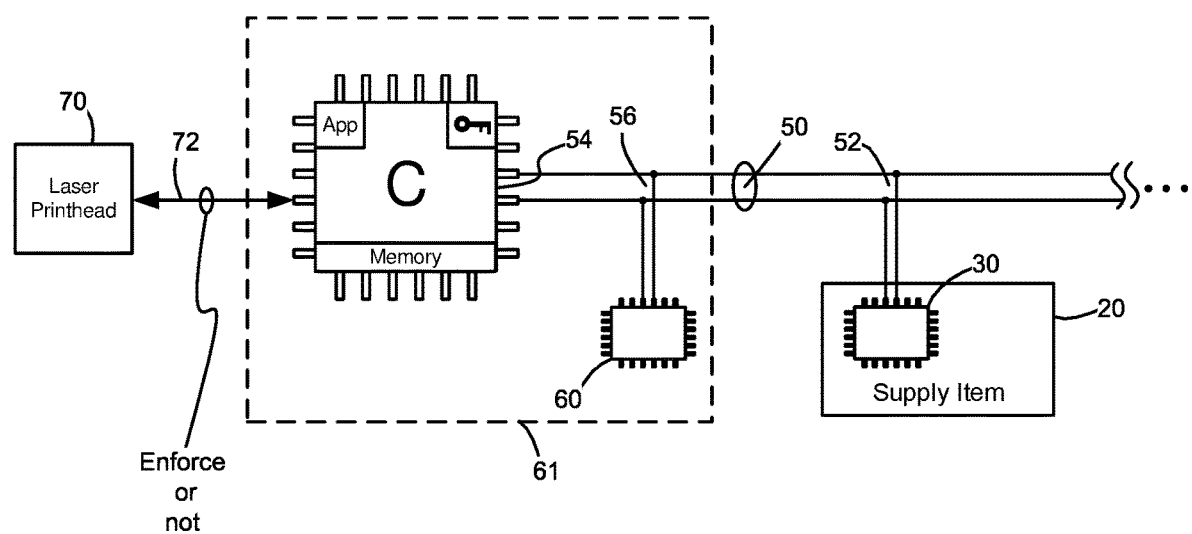
FIG. 2 is a diagram of a controller of an imaging device configured on a master node of an I2C communications bus and multiple chips configured on slave nodes of the bus, including a supply item.

With reference to FIG. 2, the chip 30 of the supply item 20 is configured with the controller C of the imaging device by way of a suitable communications system. In one embodiment, the system comprises an I2C (Inter-Integrated Circuit) communications bus 50. It includes clocking and data lines tied to the controller and chip and power/ground lines (not shown). The chip 30 is configured on a slave node 52 of the bus while the controller C is configured on a master node 54 of the bus. A chip 60 is also configured on the bus as another slave on a slave node 56. It resides in the imaging device and can be arranged or not with the controller on a common circuit card 61. It functions to provide service to the controller as a liaison to the controller by mediating commands and responses to and from the chip 30 of the supply item. As both chips have a common heritage and programming understood by one another, they are able to communicate according to known authentication and encryption/decryption protocols, for example. The chip 60 bundles and receives communications from chip 30 and verifies or not to the controller that responses of the chip 30 are trustworthy. As is typical of I2C, the controller communicates with its slaves by uniquely addressing them and the slaves reply or not according to the address on the bus. Still other slaves are contemplated for communication with the controller as indicated by the ellipses of the bus 50. They include, but are not limited to, chips associated with variously colored toner cartridges in the imaging device, fuser assemblies, imaging units, ITMs, and the like.

The controller C is also configured to connect to traditional electrophotographic (EP) components of the imaging device to create hard copy outputs on media, such as a laser printhead 70. The controller communicates with the EP components on a channel 72 and such may be further used to effectuate or not an enforcement condition on the channel, such as allowing or preventing imaging operations to occur. Items necessary to the controller to allow enforcement and to generally communicate with the EP components and chips on the bus are provided. They include, but are not limited to, applications, programs, keys, and memory, both volatile and non-volatile. In the non-volatile memory, a certificate 59 (FIG. 1) is stored for access by the controller. The stored certificate 59 contains features of the various types of supply items and their associated chips that may be installed in the imaging device and configured on the communications bus. For example, if the supply item typifies a toner cartridge, the stored certificate 59 includes features relating imaging toner of the cartridge to imaging pixels actually produced on hard copy sheets of media imaged by the imaging device. Still other embodiments are possible.

With reference back to FIG. 1, the role of the certificates 46, 59 of the supply item and the imaging device are now described to track a lifetime of the allowed usage of supply items in the imaging device, especially tracking imaging toner of supply items 20 configured as toner cartridges. At a high level, the tracking of imaging toner consists of secure metering between the supply item and the imaging device. It operates like a micro-payment system with many small-sized authorizations of quanta from the supply item to the imaging device representing "pay-as-you-go." The imaging device maintains several accumulators to track both "authorized usage" of the supply item, dictated by the quanta and multipliers of the supply and stored certificates, and actual use or "metered usage" measured by the imaging device for each supply item. The metered usage is tracked in real time as toner is used and sheets of media are printed for each supply item. The metered usage can be tracked as actual pixels imaged on media and the controller obtains them per the print job being rendered in the imaging device. The controller can also reconcile the imaging pixels to counts of media pages as flagged by a top-of-page indicator in the print job. As metered usage gets close to authorized usage, during imaging, it is necessary to request more usage from the supply item via a command from the imaging device stylized as a quanta request. One quanta from the supply item gives the imaging device more authorized usage. The amount of allowed usage in a quanta is derived from parameters set in the stored certificate 59 of the imaging device 8 and the multiplier 45 in the SCert 46 of the supply item 20. To prevent counterfeiters from merely adding quanta or increasing allowable usage of the supply item, the quanta negotiations between the imaging device and supply items occurs in a quanta decrement-only fashion until the quanta is depleted, thus ending the allowable usage of the supply item. Also, it is preferred that requests of quanta from the imaging device to the supply item take place in a secure fashion. That the supply item and imaging device must trust one another, a mutual authentication occurs first between the devices. Additional security consists of authenticating the supply item to the imaging device in predetermined time periods.

Figure 3A:
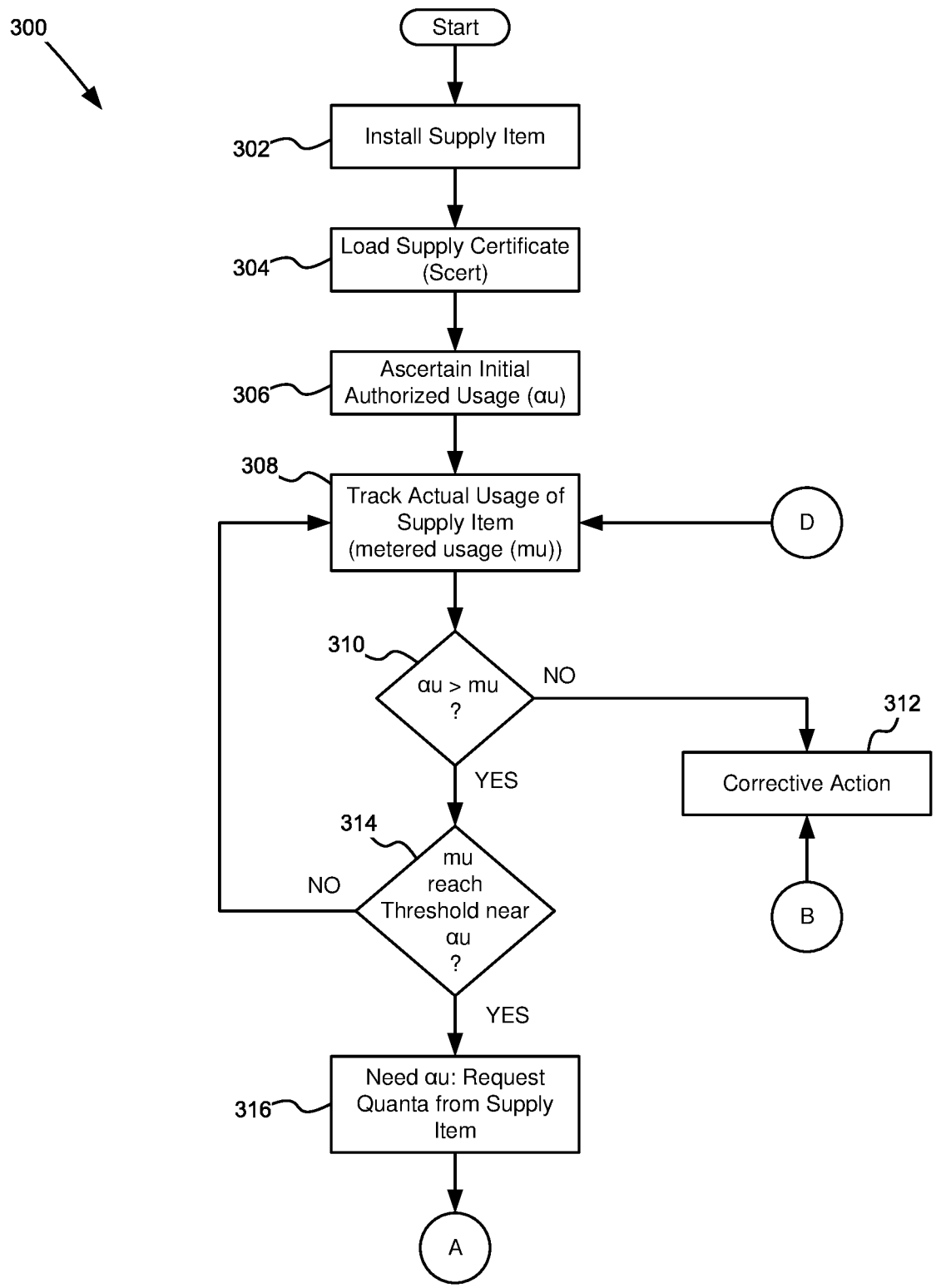
FIGS. 3A-3C are flow charts of communication between the chip of a supply item and an imaging device to track quanta of a supply item.

In more detail, a method 300 of FIG. 3A commences upon the installation of a supply item in an imaging device, 302. The chip of the supply item and the imaging device power up, initialize sessions over the I2C communications bus, and authenticate themselves to one another. The imaging device then sends to the supply item a request to receive the supply certificate and loads its contents upon receipt into an appropriate memory, 304. This includes reading and storing from the SCert the amount of quanta for the allowed usage of the lifetime of the supply item and its multiplier(s). When the supply item is configured as a toner cartridge, a representative SCert includes an initial amount of quanta Q=4,374 (unitless) and a multiplier correlating the imaging toner to quanta, in mass, where multiplier M=50 mg of toner/quanta.

Figure 4:
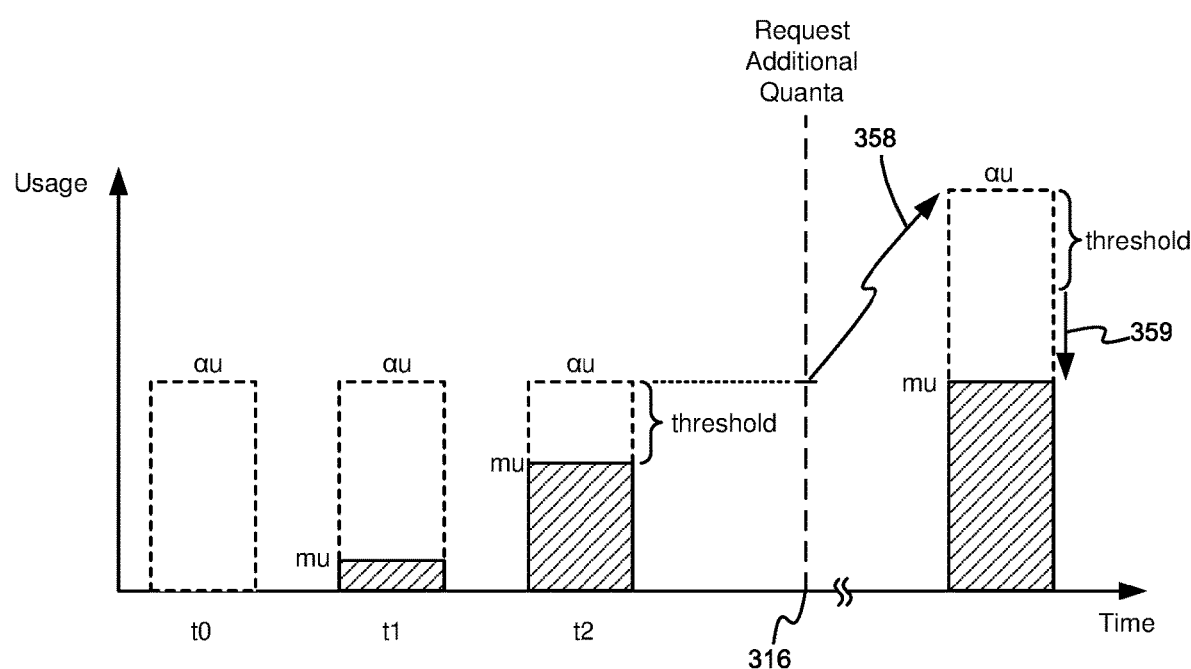
FIG. 4 is a bar graph indicating usage over time of a supply item in an imaging device.

It is expected that the initial installation of the toner cartridge causes spillage or loading of small amounts of imaging toner into the imaging unit of the imaging device. Various calibration routines are also expected to execute, including printing calibration pages thereby expending even more imaging toner from the cartridge. As it is preferred that the controller C allow these actions to take place, and not execute an enforcement on the channel 72 of the laser printhead 70 (FIG. 2), for example, there needs to exist some initial authorized amount of imaging that can take place by the imaging device, even before the imaging device negotiates a first installment of quanta from the supply item. At 306, therefore, the imaging device determines an initial authorized usage (αu) of imaging (in pixels) that can occur in the imaging device to conduct calibration and other preliminary functions. That the imaging device has general knowledge regarding how much initial imaging needs to occur, not the supply item, the controller is preconfigured to retrieve from its own certificate 59 an initial authorized usage (αu) 57 (FIG. 2) of the supply item. In an example, an initialAuthUse=6,881,245 imaging pixels. As seen in FIG. 4, this initial authorized usage (αu) is denoted at time (t0).

Referring back to FIG. 3A, the imaging device next tracks the actual imaging operations of the supply item, known as "metered usage" (mu), 308. It does so in the same units as the authorized usage, e.g., imaging pixels, but appreciating when the supply item is configured as a fuser assembly, for example, the units may define numbers of pages of media sheets. Conversion between units may also exist as imaging pixels relate to media sheets since print jobs typically include a top-of-page notifier identifying one printed page from the next. Regardless of form, the metered usage (mu) begins at zero at time t0 as seen in FIG. 4. Thereafter, it increases with printing to some measurable amount at time t1, but is less than the authorized usage (αu) and is relatively far away. As imaging operations continue, the metered usage increases relative to the authorized usage. However, so long as the authorized usage exceeds the metered usage, 310, and the metered usage remains relatively far away from the authorized usage, 314, imaging operations continue and the controller tracks imaging at 308.

At 314, however, the metered usage eventually reaches a threshold of closeness to the authorized usage as seen at time (t2) (FIG. 4), for example. The controller then needs to obtain more authorized usage and does so by requesting additional quanta from the supply item, 316. The measure of closeness to the authorized usage at 314 that triggers the request for more quanta at 316 is predetermined and stored for access by the controller as a warning threshold 51 in certificate 59, FIG. 1. Alternatively, the threshold can be stored for access by the controller on the chip 30 of the supply item, the chip 60 of the imaging device, or elsewhere. In one embodiment, the threshold in certificate 59 is defined as an enforceUseThreshold=10.22M pixels, but any number of imaging pixels can be used.

It should be appreciated, however, that if the controller does not initiate the request for additional quanta, continued operations of the imaging device causes the metered usage to eventually catch or reach the amount of the authorized usage and the condition αu>mu at 310 remains no longer satisfied. As such, the imaging device would be forced at 312 to take corrective action. Actions of this type include, but are not limited to, executing diagnostic routines, throwing errors, setting flags, ceasing functions, repeating calculations or processes, and/or ultimately preventing imaging operations via enforcement on channel 72 between the controller and the laser printhead or other EP components.

Figure 3B:
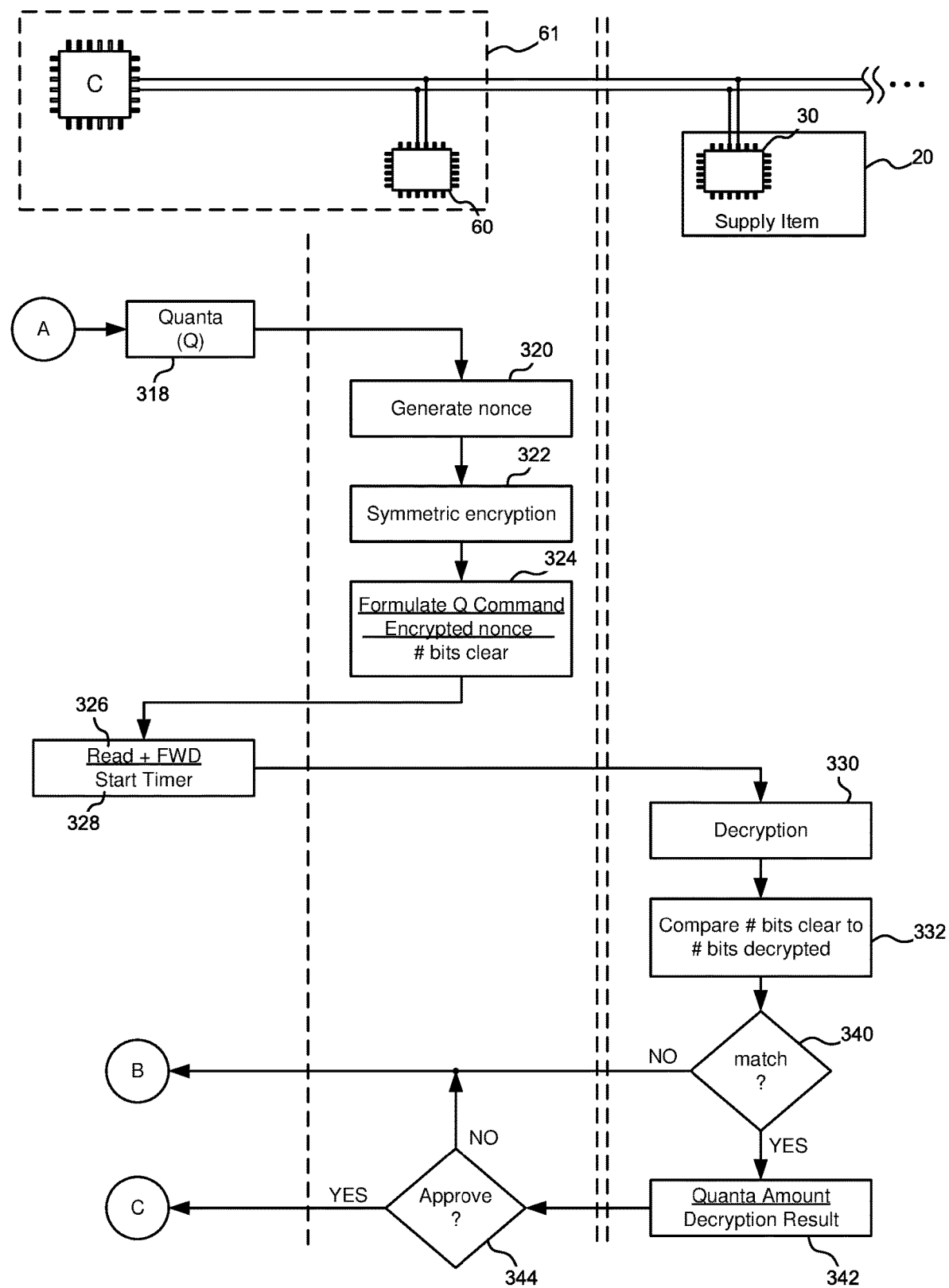

With reference to FIG. 3B, the request by the imaging device for more quanta from the supply item begins with the controller C of the imaging device determining how much quanta it requires. The actual amount is variable dependent on various factors, particularly volume of printing by users or sizes of print jobs. For example, if users of the imaging device are imaging hundreds of pages per multiple print jobs per day, the increase in authorized usage, thus the request for more quanta, must be made very large in order to prevent enforcement on channel 72 (FIG. 2). Alternatively, if users of the imaging device only image one page per one print job per week, increases in the authorized usage can be made in much smaller amounts and made less frequently. Alternatively still, the request for quanta can occur in predefined increments, such as small percentages (e.g., 1%) of the original amount of quanta of the supply certificate, e.g., the micro-payment. Still other embodiments are possible.

Regardless of amount, the controller of the imaging device formulates a command for additional quanta 318 and such is packaged for delivery to the slave chip 60 of the imaging device. Upon receipt, the chip 60 takes several steps to formulate a challenge to the chip 30 of the supply item. First, the chip 60 undertakes encryption of the quanta command. This includes first generating a nonce, 320. The nonce can be of any size. Next, the nonce is encrypted, 322. This includes symmetric encryption, such as AES (Advanced Encryption Standard) or TDES (triple data encryption standard) encryption. It includes key whitening, or not. The chip 60 does this at least once, but may encrypt and key whiten for as many times as the system dictates. At 324, the chip 60 then formulates the challenge for quanta of the chip 30 of the supply item and sends that, the encrypted nonce, and a select plurality of bits from the nonce (unencrypted or 'in the clear') back to the controller for sending to the chip 30 of the supply item. The unencrypted select bits can be of any size and selected anywhere in the nonce, such as the beginning, end, or middle. The controller then reads the package from the chip 60 and forwards it to the supply item, 326. The controller also starts a timer, 328.

Upon receipt, the chip 30 of the supply item decrypts the formulation of the request in a manner similar to the way in which it was created. That is, the chip 30 performs an AES or TDES decryption, including key whitening as appropriate, 330, for as many times undertaken by the chip 60 at 322. The chip of the supply item next compares the plurality of select bits from the result of the decryption to the same plurality of select bits it received in the clear from the imaging device, 332. If the bits match, 340, then the chip 30 of the supply item sends back to the imaging device its formulated response, 342. The response 342 includes the decryption result and the quanta amount requested from the controller at 318. The response 342 is initially sent to the controller, then to chip 60 according to the I2C protocol. At 344, the chip 60 then verifies whether or not the response from the supply item was appropriate, such as formatting. If so, the chip 60 approves this to the controller. If not, corrective action is taken at 312. Similarly, corrective action is taken at 312 if no match exists at 340 in the comparison of the select bits of the decryption and the select bits in the clear.

Figure 3C:
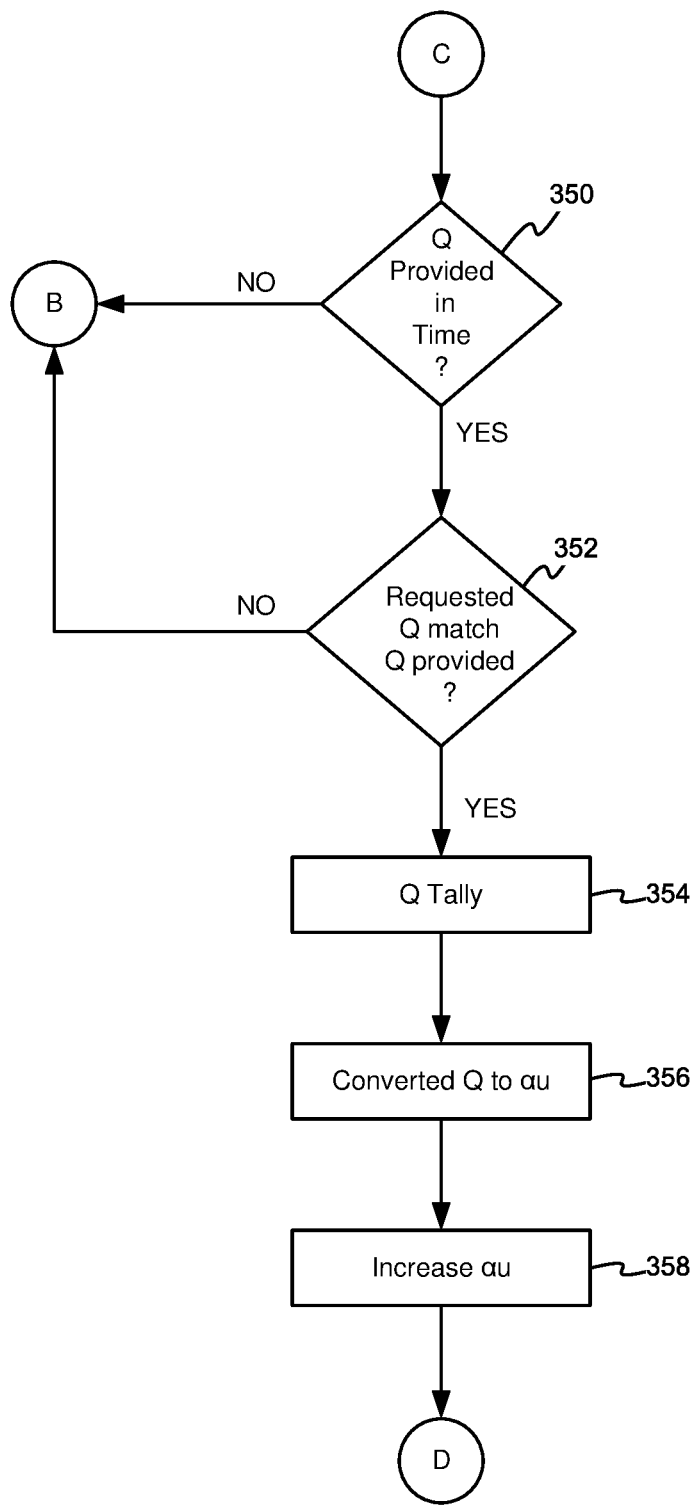

With reference to FIG. 3C, the controller next determines whether or not the quanta provided from the supply item arrived within time, 350, as set by the timer started by the controller at 328. The value of the timer can be any, but corresponds to 310 msec in one embodiment and the controller knows it by accessing the timer value 55 from its stored certificate 59 (FIG. 1). At 352, the controller next determines whether or not the amount of quanta returned from the chip of the supply item at 342 matches the amount of quanta originally requested by the controller at 318. If the controller requested 100 quanta, 100 quanta should be the amount returned from the supply item. If no match occurs, then corrective action can be undertaken by the imaging device at 312. Likewise, corrective action can be undertaken by the imaging device if the quanta response from the supply item does not occur in time at 350. The controller also can reverse the order of its determinations regarding time 350 and quanta matching 352.

At 354, the controller and the supply item next tally the amount of quanta provided from the supply item to the imaging device. That is, if the original quanta=4,374 from the SCert, and the amount of quanta requested from the imaging device at 318 was 100 quanta, then both the imaging device and the supply item decrement the requested quanta from the original quanta, or 4,374−100=4,274 quanta remaining. They both save off that response in memory. Upon a next request for additional quanta, say in the amount of 150 quanta, the response in memory starts the tallying at 354 such that the quanta remaining is 4,124=4,274−150. The process continues until, eventually, insufficient quanta remains with the supply item and the supply item cannot return to the imaging device an appropriate amount of quanta. This indicates to the controller an end of the allowed usage of the supply item.

At 356, the imaging device converts to authorized usage the quanta it received from the supply item and increases the authorized usage in the imaging device, 358. From the supply certificate, earlier loaded in the imaging device at 304, the imaging device knows that the multiplier M correlates the mass of the toner to the quanta, e.g., M=50 mg of toner/quanta. In turn, quanta times the multiplier results in mass of the toner. If the imaging device requested 100 quanta from the supply item and that same amount of quanta was returned to it, then Q×M=100 quanta×50 mg of toner/quanta=5000 mg of toner. Further, from the stored certificate 59 in the imaging device (FIG. 1), an additional multiplier 53 exists that makes known to the imaging device a correlation between the mass of toner to imaging pixels. The value of the multiplier is predetermined and is calculated from imaging standards such as ISO pages and types of toner. In turn, if multiplier 53=751,880 pixels/mg of toner, the authorized usage αu in imaging pixels made available by the requested additional quanta is: multiplier 53 of the stored certificate times (Q×M), or αu=751,880 pixels/mg of toner× 5000 mg of toner=3,759,400,000 pixels. With reference to FIG. 4, the authorized usage in the imaging device is seen as increasing 358, such as at time (t3), and the metered usage mu is again relatively far 359 from the closeness threshold. Imaging continues and the process repeats until the metered usage eventually, again, reaches the threshold. In turn, this forces the request for additional quanta from the supply item in order to increase the authorized usage of printing in the imaging device. After many cycles of repeating this, the supply item runs out of quanta that it can give to the imaging device, thereby indicating an end of life. It is intended, however, that the imaging toner of the toner cartridge actually run out before the quanta runs out so that users of toner cartridges consume all of the imaging toner of the supply item. The quanta amount also should be close to being exhausted shortly after the toner runs out so that refillers and remanufacturers of toner cartridges cannot simply add more toner to the housing of the cartridge and still have remaining quanta in the supply certificate, thereby allowing more authorized usage. Of course, other schemes are possible.

Figure 5:
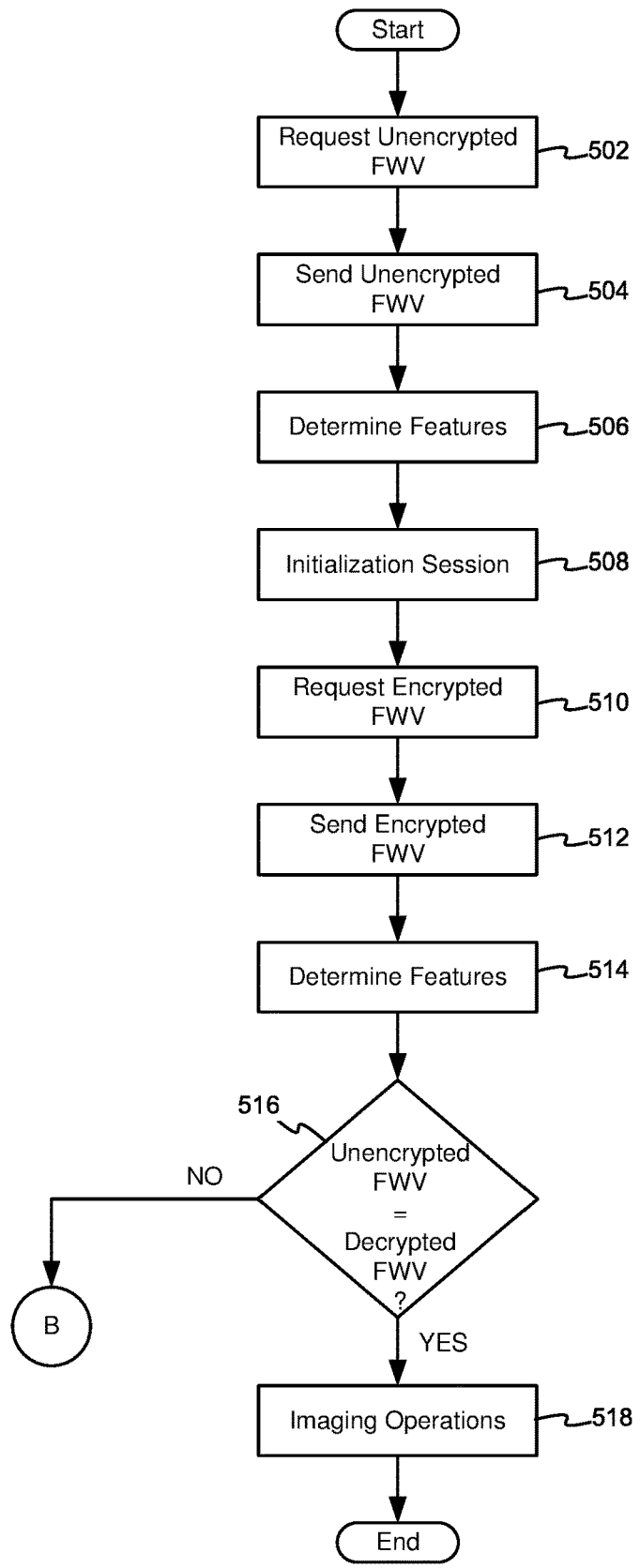
FIG. 5 is a flow chart of communication between the chip of a supply item and an imaging device utilizing a firmware version of the chip.

With reference to FIG. 5, installation of the supply item in the imaging device causes an initialization process to occur so that proper communications channels are established between the two and that the controller knows it can trust the supply item. As part thereof, the imaging device first requests 502 and receives 504 from the supply item the firmware version of the supply item as it resides in memory 40, such as at FWV 42 (FIG. 1). The controller requests this in an unencrypted manner to informally check the presence or not of any and all supply items on the communications bus and to ascertain that they are electrically connected and ready for further communications. Upon receipt, the imaging device next checks the software features available to the supply item by correlating the number of the firmware version to a stored reference indicating the same, 506. The imaging device references this from its stored certificate or from elsewhere, such as at local or remote memory.

Next, the imaging device establishes more formal communications with the supply item by starting an initialization session 508. It then requests 510 and receives 512 from the supply item an encrypted instance of the same firmware version FWV of the supply item it earlier requested and received in the clear. That the firmware version FWV is now encrypted, communication between the controller and the chip of the supply item takes place by way of the liaison function of chip 60 of the imaging device (FIG. 2). Upon the chip 60 notifying the controller of the imaging device that the response from the supply item is trustworthy, the controller again correlates the firmware version FWV of the chip of the supply item to relevant software features by referencing its stored certificate, 514. At 516, the imaging device next confirms whether or not both the unencrypted instance of the firmware version and the decrypted version of the encrypted instance of the firmware version from the supply item match one another. If so, imaging operations can proceed, 518. If not, corrective action can take place at 312 to troubleshoot why the firmware versions do not match one another.

Figure 6:
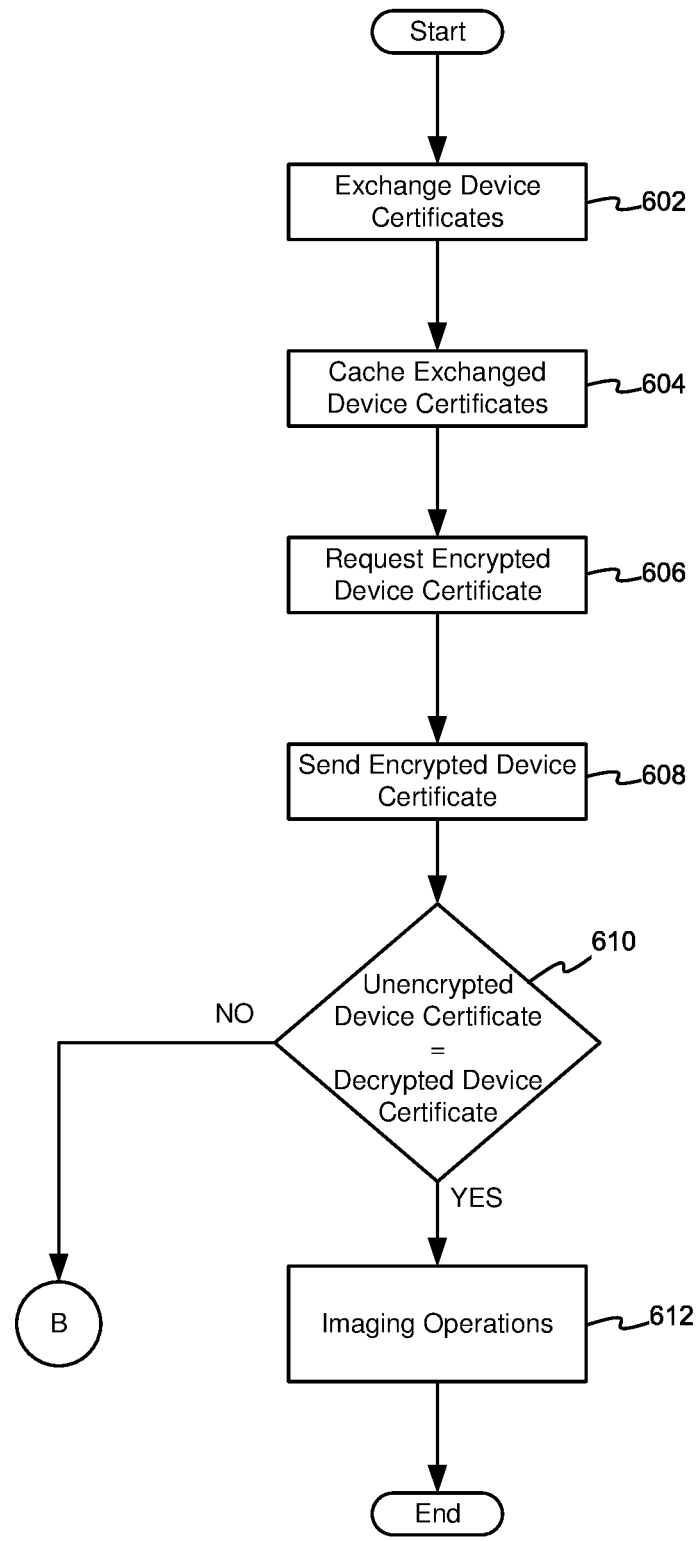
FIG. 6 is a flow chart of communication between the chip of a supply item and an imaging device utilizing device certificates, including a slave chip of the imaging device.

Similarly, FIG. 6 also notes the initialization process between the supply item and imaging device so that proper communications channels and trust are established between the chip 30 and controller C. As part thereof, the chips 30, 60 of the supply item and the imaging device swap or exchange their device certificates with one another, 602. They do so first in the clear (unencrypted) to establish an informal handshake with one another, verifying the device certificate received from the other. That the communications bus is configured with the controller of the imaging device being a master and each of the chips 30, 60 being slaves, the unencrypted device certificates swapped with one another are passed through the controller of the imaging device and whereupon they are cached at 604. Next, the controller of the imaging device requests 606 and receives 608 from the supply item an encrypted instance of the device certificate 44 of the supply item 30 (FIG. 1). At 610, the imaging device confirms whether or not both the unencrypted instance and decrypted instance of the encrypted instance of the device certificates from the supply item 30 match one another. If so, imaging operations take place at 612. If not, corrective action is undertaken at 312.

The foregoing illustrates various aspects of the invention. It is not intended to be exhaustive. Rather, it is chosen to provide the best mode of the principles of operation so one skilled in the art can practice the invention without undue experimentation. All modifications and variations are contemplated within the scope of the invention as determined by the appended claims. Relatively apparent modifications include combining one or more features of one embodiment with those of another embodiment.

The invention claimed is:

1. A method of setting up electrical communications between an imaging device and a toner cartridge installed in the imaging device, the imaging device having a master controller and a first slave chip on an I2C communications bus and the toner cartridge having a second slave chip, the first and second slave chips each having a memory storing therein a device certificate, comprising:

exchanging said device certificates between the first and second slave chips to verify trust there between; and thereafter, providing from the second slave chip of the toner cartridge to the master controller of the imaging device an encrypted instance of the device certificate of the second slave chip, wherein the device certificate of the second slave chip includes a device unique public key signed by a global key.

2. The method of claim 1, further including caching the device certificate of the second slave chip of the toner cartridge during the exchanging.

3. The method of claim 2, further including comparing a decrypted instance of the encrypted instance of the device certificate of the second slave chip to the cached device certificate of the second slave chip.

4. The method of claim 3, further including determining whether a match exists between the decrypted instance of the device certificate of the second slave chip and the cached device certificate of the second slave chip.

5. The method of claim 4, further including allowing or not imaging operations of the imaging device to occur depending on whether or not the match exists.

6. The method of claim 1, further including receiving at the toner cartridge a command on the I2C communications bus from the imaging device to provide the device certificate of the second slave chip to the first slave chip.

7. The method of claim 1, further including receiving at the toner cartridge a command on the I2C communications bus from the imaging device to provide to the master controller the encrypted instance of the device certificate of the second slave chip.

8. A method of setting up electrical communications between an imaging device and a toner cartridge configured for installation in the imaging device, the imaging device having a controller and a first chip in communication with each other and the toner cartridge having a second chip configured to electrically communicate therewith, comprising:

providing the second chip of the toner cartridge with a memory storing therein a device certificate identifying the second chip;

configuring the second chip of the toner cartridge to receive one or more requests for the device certificate from the imaging device; and configuring the second chip of the toner cartridge to provide to the imaging device both an unencrypted and encrypted instance of the device certificate, wherein the device certificate of the second chip of the toner cartridge includes a device unique public key signed by a global key.

9. The method of claim 8, further including determining whether a match exists or not between the unencrypted instance and a decrypted instance of the encrypted instance of the device certificate to allow or not imaging operations of the imaging device.

10. The method of claim 9, further including providing the encrypted instance of the device certificate after providing the unencrypted instance of the device certificate.

11. The method of claim 10, further including caching the unencrypted instance of the device certificate.

12. The method of claim 11, further including passing the device certificate of the second chip of the toner cartridge from the controller to the first chip of the imaging device.

13. The method of claim 8, further including providing a device certificate of the first chip to the second chip of the toner cartridge.

14. The method of claim 8, further including configuring the second chip of the toner cartridge to receive a device certificate of the first chip of the imaging device.

15. The method of claim 14, further including exchanging encryption keys between the first and second chips.

16. A method of setting up electrical communications between an imaging device and a toner cartridge configured for installation in the imaging device, the imaging device having a controller and the toner cartridge having a chip configured to electrically communicate therewith, the chip of the toner cartridge having a memory storing a device certificate identifying the chip, comprising enabling the chip of toner cartridge to provide to the imaging device both an unencrypted and encrypted instance of the device certificate, wherein the device certificate of the chip of the toner cartridge includes a device unique public key signed by a global key.

17. The method of claim 16, further including enabling the chip of the toner cartridge to receive one or more requests for the device certificate from the imaging device.

18. The method of claim 16, wherein the chip of toner cartridge is configured to provide to the controller of the imaging device first the unencrypted instance of the device certificate and later the encrypted instance of the device certificate.

19. The method of claim 16, further including swapping the device certificate of the toner cartridge with a second device certificate of a second chip of the imaging device.

20. The method of claim 16, further including comparing the unencrypted instance and a decrypted instance of the encrypted instance of the device certificate.

* * * * *